C. SHEARD AND E. D. TILLYER.
OPHTHALMIC LENS.
APPLICATION FILED DEC. 15, 1920.
1,426,513.  Patented Aug. 22, 1922.
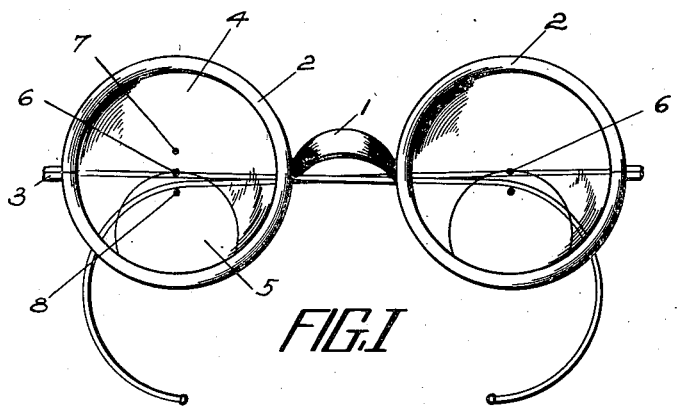
FIG.I
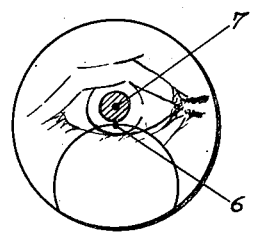
FIG.II
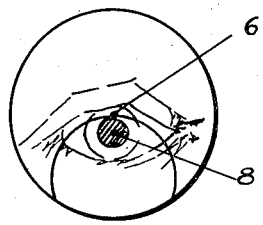
FIG.III
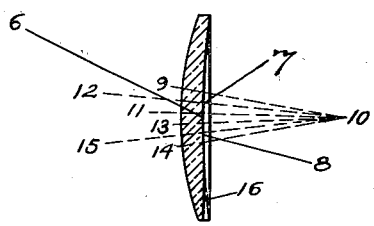
FIG.IV
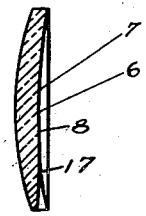
FIG.V
INVENTOR
CHARLES SHEARD
EDGAR D. TILLYER
BY
ATTORNEYS

UNITED STATES PATENT OFFICE.

CHARLES SHEARD, OF STURBRIDGE, AND EDGAR D. TILLYER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

1,426,513.      Specification of Letters Patent.      Patented Aug. 22, 1922.

Application filed December 15, 1920. Serial No. 430,913.

*To all whom it may concern:*

Be it known that we, CHARLES SHEARD and EDGAR D. TILLYER, citizens of the United States, residing at Sturbridge, Massachusetts, and Southbridge, Massachusetts, respectively, in the county of Worcester and State of Massachusetts, have invented certain new and useful Improvements in Ophthalmic Lenses, of which the following is a specification.

This invention relates to improvements in ophthalmic lenses and has particular reference to lenses of the bifocal type.

The principal object of the present invention is to provide a novel properly centered form of bifocal lens in which the centers of both the distance portion and the reading portion shall be so disposed as to lie in the most usable position and where there will be the least prismatic effect on the eye when looking through the normally correct portion of the lens.

A further object of the present invention is the provision of improved construction of bifocal lenses in which the lenses are all constructed with their centers in a certain definite relationship to the lens so that no difficulties will be experienced in fitting the eye due to unequal corrections before the two eyes and thus unequal prismatic effects, as is liable to occur at the present time.

Other objects and advantages of our improved construction should be readily apparent by reference to the following specification taken in connection with the accompanying drawings and it will be understood that we may make any modifications in the specific features hereinafter disclosed within the scope of the appended claims without departing from or exceeding the spirit of our invention.

Figure I represents a front view of a mounting embodying our improvements.

Figure II represents a semi-diagrammatic view illustrating a lens with an eye looking through the distance portion thereof.

Figure III represents a similar view with the eye looking through the reading portion.

Figure IV represents a vertical diagrammatic sectional view, the line of vision being indicated by dotted lines.

Figure V represents a sectional view through a different power of lens.

In the drawings, the numeral 1 designates the bridge of an ophthalmic mounting provided with the frames 2 and temples 3 for retaining the same in position on the face. These frames are shown as having mounted therein lenses constructed in accordance with our improvement and comprising a distance portion 4 and a near vision portion 5. In the sectional views we have shown these as constructed from a single piece of glass, but it will be understood that they may be formed either from a single piece of glass, two pieces of glass fused or cemented together, or in any other well known construction of bifocal lenses, so long as they are constructed in accordance with and embody the new principles of our invention as distinguished from the hitherto known practices.

Prior to our invention lenses both bifocal and plain have been generally so constructed that their center in the case of a single vision lens, or the center of the distance portion in the case of a multifocal lens, has been at the geometric center of the lens, or at 6, so that the eye looking straight through the center of the lens would experience no prismatic effect. Some attempts have been made in the past to lower this center, as in the case of monocentric bifocals, where the center of the lens is attempted to be disposed at the dividing line between the two fields, while the centers of the reading portions have varied considerably according to the particular reading correction, about the only control of their position used in the past having been the varying of the size of the segment in the case of one-piece bifocal lenses, or the like, this variance in size it will be understood serving to shift to a degree the position of the center of the reading portion.

It is the purpose of our invention, however, to provide the most efficient possible lens and a lens in which the eye looking in normal position through the distance portion or in normal or most used position through the reading portion, will be looking through the center of the lens and this without variance in the size or shape of the reading segment or section, and regardless of the particular power in the reading portion. In accomplishing this result we preferably so construct our lens by proper and well known relationship of the curves on the front and back surfaces that the center of the distance portion will be at 7, about two and one-half to three millimeters above the dividing line between the reading and distance portions, while the optical center of the reading portion 5 will be at 8, substantially three millimeters below the dividing line, the lens being so cut that the dividing line itself in the center will preferably lie at the point 6 or geometric center of the lens, the centers of the distance and reading portions, therefore, being substantially three millimeters above and three millimeters below the geometric center of the lens.

The purpose of this particular centering should be best understood by reference to Figures II, III and IV, from which it will be noted that in Figure II the eye is centered and looking through the center point 7 of the distance portion and the bottom edge of the pupil is disposed just above the point 6 which lies on the line of division between the distance and reading portions, while in Figure III the pupil is centered on the point 8 or center of the lens and the upper edge of the pupil is just below the point 6. In other words, in each instance the center is substantially one-half the diameter of the pupil of the eye from the line of division. It is a well recognized fact that in the use of bifocals the eye ordinarily uses the lens very close to the line of division between the center and reading portions. The monocentric bifocal, therefore, has been devised in the past on the theory that it would eliminate all prism difficulties as the eye moved from one field to the other and any possible displacement of images. The designers of this bifocal, however, overlooked the fact that the pupil of the eye which receives the light rays is not a point but has an appreciable width and receives an appreciable bundle of rays. It is, therefore, impossible for the pupil to center upon the dividing line as the center of the lens, since it would then take in half of the distance portion and half of the reading portion rays in its bundle. The two centers, therefore, according to our invention are disposed at a distance at least equal to the diameter of the pupil of the eye apart so that the eye looking immediately on either side of the line will be looking through the exact center of that portion of the lens and not at all off center. This is perhaps best understood by reference to Figure IV of the drawings, in which the dotted lines 9, 10, 11, indicate the bundle of rays received by the pupil when looking along the center line 10—12 representing the optical center or axis of the distance portion. The lines 13—10—14 represent the bundle of rays received into the pupil of the eye when looking along the line 10—15 or optical axis or center line of the reading portion. These lines are spaced slightly apart so that they lie just on opposite sides of the point 6 at the line of division between the near and distance fields.

In practice we manufacture all our lenses to comply with this requirement, as will be understood by a comparison of Figures IV and V, from which it will be seen that with different curves 16 and 17, respectively, for example, as shown in Figures IV and V, the curves are so related to the remainder of the lens that in both instances the optical center of the reading portion will fall at the point 8, which point, as stated, is approximately one-half the maximum diameter of the pupil of the eye below the dividing line so that the entire pupil of the eye may be below the dividing line and looking through the center of the portion of the lens then in use.

We claim:

1. A bifocal lens having its centers disposed on opposite sides of the dividing line between the two vision portions and separated a distance slightly greater than the diameter of the pupil of the eye.

2. A bifocal lens having the line of division between the two fields disposed at the geometric center of the lens and having the centers of the two fields of vision disposed on opposite sides of said line and separated a distance equal to at least the diameter of the pupil of an eye.

3. A bifocal lens having the optical centers of its two fields disposed adjacent to and substantially equi-distant on both sides of the dividing line therebetween.

4. A bifocal lens having the optical centers of the two vision fields disposed about three millimeters respectively above and below the line of division separating the fields.

In testimony whereof we have affixed our signatures, in presence of two witnesses.

CHARLES SHEARD.
EDGAR D. TILLYER.

Witnesses:
ESTHER M. LAFLER,
ALICE G. HASKELL.